(12) United States Patent
Harmon et al.

(10) Patent No.: US 12,017,615 B2
(45) Date of Patent: Jun. 25, 2024

(54) FRONT TRUNK INCLUDING CLOSURE SECTION CONFIGURABLE INTO TWO DEPLOYED POSITIONS

(71) Applicant: Ford Global Technologies, LLC, Dearborn, MI (US)

(72) Inventors: Michael John Harmon, Northville, MI (US); Marius Curea, Canton, MI (US); Benjamin Howard, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 17/892,249

(22) Filed: Aug. 22, 2022

(65) Prior Publication Data

US 2024/0059223 A1 Feb. 22, 2024

Related U.S. Application Data

(60) Provisional application No. 63/347,704, filed on Jun. 1, 2022.

(51) Int. Cl.
*B60R 5/02* (2006.01)
*B62D 25/08* (2006.01)
*B62D 25/10* (2006.01)

(52) U.S. Cl.
CPC ............. *B60R 5/02* (2013.01); *B62D 25/087* (2013.01); *B62D 25/105* (2013.01)

(58) Field of Classification Search
CPC .... B60R 2/02; B60R 2/04; B60R 9/06; B62D 25/087; B62D 25/105; B62D 33/0273; B62D 33/03

USPC .................... 296/24.45, 37.1, 37.6
See application file for complete search history.

(56) References Cited

U.S. PATENT DOCUMENTS

| | | | |
|---|---|---|---|
| 5,692,792 A | 12/1997 | Klar | |
| 6,032,587 A | 3/2000 | Salenbauch et al. | |
| 7,628,439 B1 | 12/2009 | Strong | |
| 7,798,072 B2 | 9/2010 | Becker et al. | |
| 7,963,231 B2 | 6/2011 | Osborne et al. | |
| 8,020,912 B2 * | 9/2011 | Lounds | B60J 5/103 296/76 |
| 10,480,239 B1 * | 11/2019 | Wisneski | B62D 25/12 |
| 10,926,705 B2 | 2/2021 | Hoffman et al. | |
| 11,912,237 B2 * | 2/2024 | Harmon | B60R 5/02 |
| 2022/0032796 A1 | 2/2022 | Salter et al. | |

(Continued)

*Primary Examiner* — Jason S Daniels
(74) *Attorney, Agent, or Firm* — Vichit Chea; Carlson, Gaskey & Olds, P.C.

(57) ABSTRACT

A front trunk includes a closure section configurable into two deployed positions, namely an intermediate deployed position and a fully deployed position. In some aspects, the techniques described herein relate to a motor vehicle, including: a front trunk establishing a cargo space; and a closure assembly configured to selectively cover and uncover the front trunk, wherein the closure assembly includes an upper section and a lower section moveable independent of the upper section, wherein the lower section is configured to move between a closed position, an intermediate deployed position in which the lower section uncovers a portion of the front trunk, and a fully deployed position in which an upper surface area of the lower section is greater than the upper surface area of the lower section in the intermediate deployed position.

18 Claims, 4 Drawing Sheets

(56) References Cited

U.S. PATENT DOCUMENTS

2022/0289312 A1* 9/2022 Aquila .................... B60R 5/02
2023/0391272 A1* 12/2023 Harmon ................ H02J 7/0044

* cited by examiner

FRONT TRUNK INCLUDING CLOSURE SECTION CONFIGURABLE INTO TWO DEPLOYED POSITIONS

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to a front trunk including a closure section configurable into two deployed positions, namely an intermediate deployed position and a fully deployed position.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk establishing a cargo space; and a closure assembly configured to selectively cover and uncover the front trunk, wherein the closure assembly includes an upper section and a lower section moveable independent of the upper section, wherein the lower section is configured to move between a closed position, an intermediate deployed position in which the lower section uncovers a portion of the front trunk, and a fully deployed position in which an upper surface area of the lower section is greater than the upper surface area of the lower section in the intermediate deployed position.

In some aspects, the techniques described herein relate to a motor vehicle, wherein the lower section includes first and second panels moveable independent of one another.

In some aspects, the techniques described herein relate to a motor vehicle, wherein, when the lower section is in the fully deployed position, at least a portion of an upper surface of the first panel and at least a portion of an upper surface of the second panel are formed of a different texture or finished surface than a remainder of the first and second panels.

In some aspects, the techniques described herein relate to a motor vehicle, wherein, when the lower section is in the intermediate deployed position, the first panel covers the second panel when the lower section is viewed from a vertically upper perspective.

In some aspects, the techniques described herein relate to a motor vehicle, wherein, when the lower section is in the fully deployed position, the first panel is forward of the second panel.

In some aspects, the techniques described herein relate to a motor vehicle, wherein, when the lower section is in the fully deployed position, the upper surface area of the lower section is substantially twice the upper surface area of the lower section in the intermediate deployed position.

In some aspects, the techniques described herein relate to a motor vehicle, wherein: the lower section includes first and second panels moveable independent of one another, when the lower section is in the fully deployed position, surfaces of both the first and second panels define the upper surface area of the lower section, and when the lower section is in the intermediate deployed position, the upper surface area of the lower section is only defined by a surface the first panel.

In some aspects, the techniques described herein relate to a motor vehicle, wherein the upper section provides a hood of the vehicle and the lower section provides at least a portion of a grille of the vehicle.

In some aspects, the techniques described herein relate to a motor vehicle, wherein the upper section provides the hood and a portion of the grille.

In some aspects, the techniques described herein relate to a motor vehicle, wherein the lower section is configured such that when moving from the closed position to the intermediate deployed position, the first and second panels rotate substantially 90°.

In some aspects, the techniques described herein relate to a motor vehicle, wherein the first and second panels are rotatable from the closed position to the intermediate deployed position about an axis adjacent a bottom edge of the lower section.

In some aspects, the techniques described herein relate to a motor vehicle, wherein the lower section is configured such that when moving from the intermediate deployed position to the fully deployed position, the first panel rotates substantially 180° relative to the second panel.

In some aspects, the techniques described herein relate to a motor vehicle, wherein the first panel is moveable from the intermediate deployed position to the fully deployed position about an axis adjacent a front edge of the second panel.

In some aspects, the techniques described herein relate to a motor vehicle, wherein the upper section is moveable in a direction generally opposite the lower section to uncover the front trunk.

In some aspects, the techniques described herein relate to a motor vehicle, wherein the motor vehicle is a battery electric vehicle.

In some aspects, the techniques described herein relate to a method, including: moving a lower section of a closure assembly of a front trunk from a closed position in which the lower section covers a front portion of the front trunk to an intermediate deployed position in which the lower section uncovers the front trunk; and moving the lower section from the intermediate deployed position to a fully deployed position in which an upper surface area of the lower section is increased relative to the upper surface area of the lower section in the intermediate deployed position.

In some aspects, the techniques described herein relate to a method, wherein the lower section includes first and second panels moveable independent of one another, and wherein, when the lower section is in the intermediate deployed position, the first panel covers the second panel when the lower section is viewed from a vertically upper perspective.

In some aspects, the techniques described herein relate to a method, wherein, when the lower section is in the fully deployed position, the first panel is forward of the second panel.

In some aspects, the techniques described herein relate to a method, wherein moving the lower section from the closed position to the intermediate deployed position includes rotating the first and second panels by substantially 90° about an axis adjacent a bottom edge of the lower section.

In some aspects, the techniques described herein relate to a method, wherein moving the lower section from the intermediate deployed position to the fully deployed position includes rotating the first panel by substantially 180° relative to the second panel about an axis adjacent a forward edge of the second panel.

DETAILED DESCRIPTION

This disclosure relates to a front trunk including a closure section configurable into two deployed positions, namely an intermediate deployed position and a fully deployed position. Among other benefits, which will be appreciated from the below description, the disclosed features make the section of the closure assembly conducive to loading and unloading the front trunk in the intermediate deployed position, while also being able to provide a table top surface having an increased surface area for work or entertaining purposes in the fully deployed position.

Figure 1:
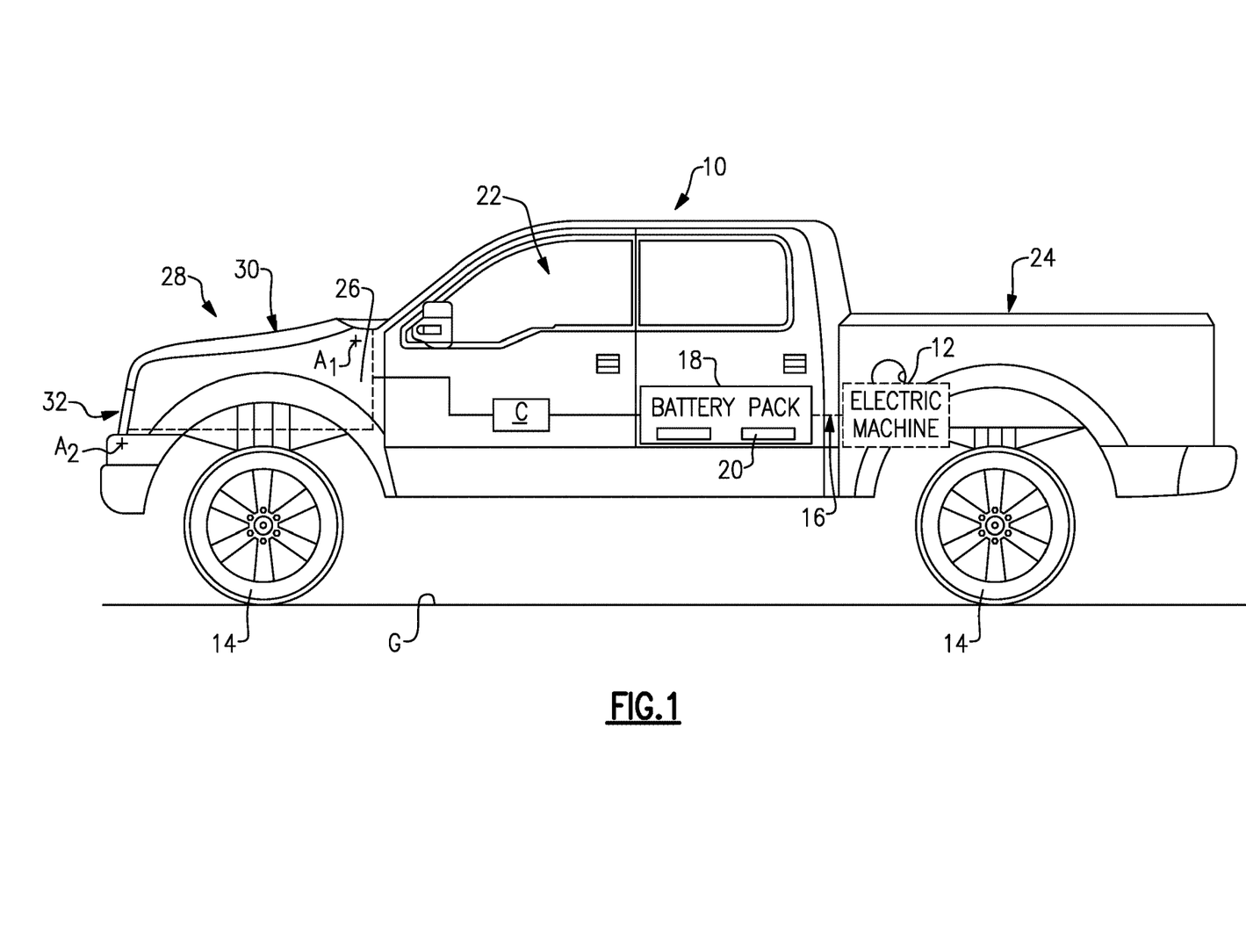
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 is a split opening and includes two independently moveable sections, namely an upper section 30 and a lower section 32, that are moveable to cover and uncover the front trunk 26. The front trunk 26, then, may be conveniently accessed through either the upper section 30, the lower section 32, or both. The upper section 30 and lower section 32 may each include one or more panels. In this example, as will be explained below, the lower section 32 includes two independently moveable panels.

In the illustrated example, the upper section 30 includes a hood of the vehicle 10 and also provides a portion of the grille of the vehicle 10. The lower section 32 provides a remainder of the grille that is not provided by the upper section 30. Alternatively, the upper section 30 could provide the hood without providing any portion of the grille, and the lower section 32 could be provide the entirety of the grille.

The portions of the upper and/or lower sections 30, 32 that provide the grille may be sized and shaped to match a grille in an engine-driven model of a vehicle, such as a pickup truck, in order to maintain the same look and allow for essentially the same front end vehicle body structure across a vehicle lineup. The portions providing the grille exhibit solid surfaces configured to keep water out of the front trunk 26. In this example, the solid surfaces are feasible in the vehicle 10 because no air flow is needed for engine cooling.

Figure 2:
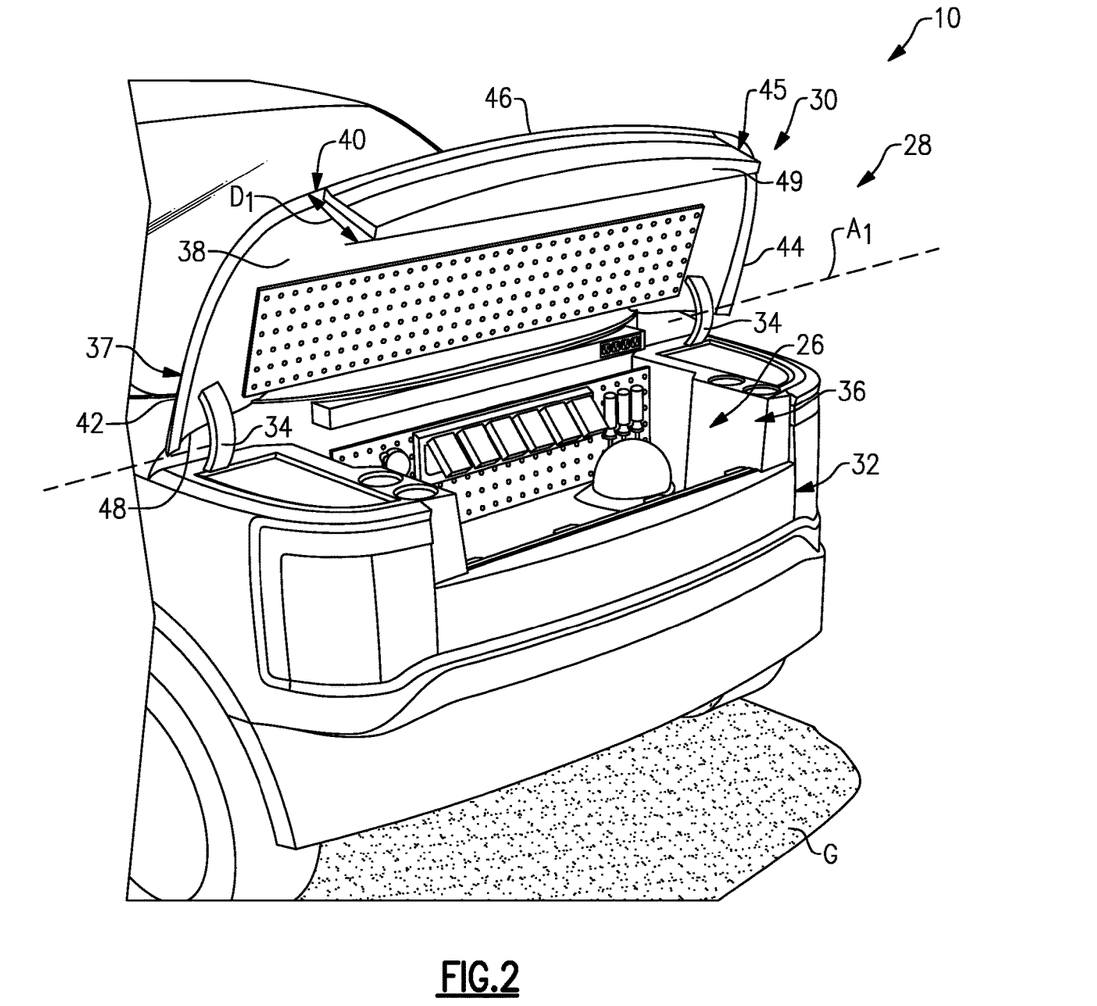
FIG. 2 is a perspective view of an exemplary front trunk of the electrified vehicle, with an upper section of a closure assembly of the front trunk in an open position, and a lower section of the closure assembly in a closed position.

With reference to FIGS. 1 and 2, the upper section 30 is rotatable about the axis $A_1$ via a pair of hinges 34 to selectively cover and uncover a first partial opening 36 of the front trunk 26, which includes a top of the front trunk 26 and an upper portion of a front of the front trunk 26. When moving from the closed position (FIG. 1) to the open position (FIG. 2), the upper section 30 rotates generally upwardly and rearwardly. The hinges 34 may be provided by strand hinges, in which one of the strands is curved. The hinges 34 may alternatively be provided by another type of hinge, such as a barrel hinge, or a linkage, such as a four bar linkage.

The upper section 30 includes a hood panel 37 including a first surface 38 and a second surface 40 opposite the first surface 38. The first surface 38 is the underside of the upper section 30. When the upper section 30 is closed, the first surface 38 faces the front trunk 26. The second surface 40 provides an exterior of the vehicle 10, and in particular provides a top of a hood panel 37 in this example. When the upper section 30 is open, the first surface 38 may be referred to as a forward surface, and the second surface 40 may be referred to as a rear surface. The first and second surfaces 38, 40 extend laterally between opposed sides 42, 44, and also extend between edges 46, 48. When the upper section 30 is closed, the edge 46 is a front edge and the edge 48 is a rear edge. When the upper section 30 is open, the edge 46 may be referred to as a top edge and the edge 48 may be referred to as a bottom edge.

In this embodiment, the upper section 30 provides a portion of the grille of the vehicle 10. Specifically, the upper section 30 includes an upper grille section 45 projecting downward from the first surface 38 at a location adjacent the edge 46. The upper grille section 45 projects a distance $D_1$ from the first surface 38 to a bottom edge 49. $D_1$ is less than the height $D_2$ of the front opening 47 (FIG. 3) of the front trunk 26. While the upper section 30 includes the upper grille section 45 in this example, this disclosure extends to upper sections 30 that do not provide any portion of a grille of the vehicle 10.

In FIG. 2, the lower section 32 is in a closed position. Despite being in the closed position, the front trunk 26 is still accessible in FIG. 2 because the upper section 30 is open. Because the lower section 32 only provides a portion of the grille of the vehicle 10, a user can relatively easily reach over the lower section 32 and into the front trunk 26 from the front of the vehicle 10.

The lower section 32 is rotatable generally forwardly and downwardly about axis $A_2$ adjacent a bottom edge of the lower section 32 when moving from the closed position to an intermediate deployed position (FIG. 3), which is generally the opposite direction the upper section 30 moves when moving from the closed position to the open position. In the intermediate deployed position, the lower section 32 completely uncovers the front opening 47 of the front trunk 26 from a front perspective.

Figure 3:
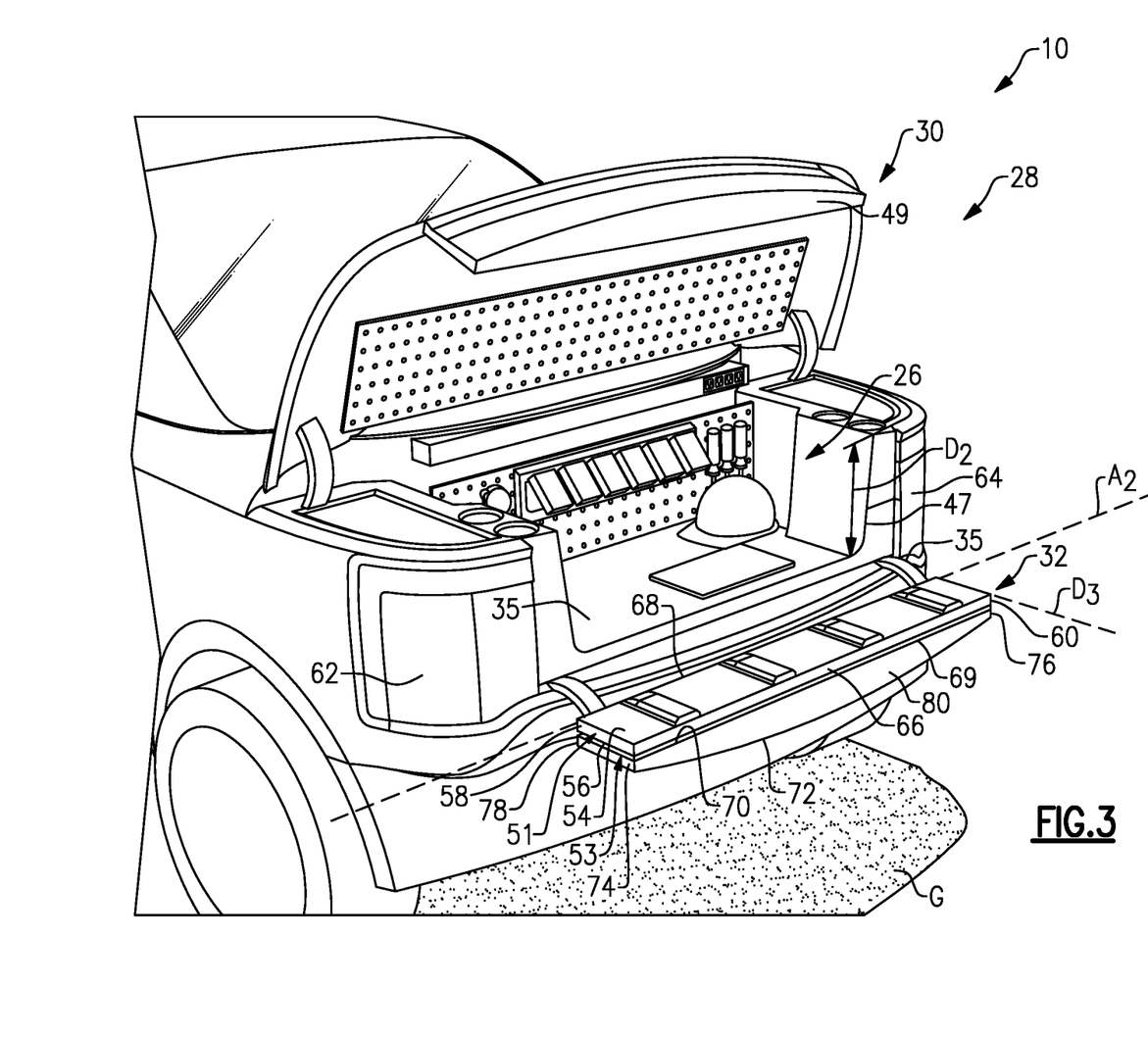
FIG. 3 is a view similar to FIG. 2 and illustrates the front trunk with the upper section in the open position, and the lower section in an intermediate deployed position.

The lower section 32 is rotatable about the axis $A_2$ via a pair of hinges 35. Axis $A_2$ is parallel to axis $A_1$ in this example. The hinges 35 may be provided by strand hinges, in which one of the strands is curved. The hinges 35 may alternatively be provided by another type of hinge or linkage.

As shown in FIG. 2, the lower section 32 includes a first panel 51 and a second panel 53. The first and second panels 51, 53 are selectively moveable together and also independent of one another. The first panel 51 includes a first surface 54 and a second surface 56 opposite the first surface 54. When the lower section 32 is in the closed position, the first surface 54 faces the front trunk 26. When the lower section 32 is in the intermediate deployed position, the first surface 54 may be referred to as a top surface of the first panel 51, and the second surface 56 may be referred to as a bottom surface of the first panel 51. The first and second surfaces 54, 56 extend laterally between opposed sides 58, 60, which in this example fit between opposed headlamps 62, 64. In this regard, the upper grille section 45 is also configured to fit between opposed headlamps 62, 64. The first and second surfaces 54, 56 also extend between edges 66, 68. When the lower section 32 is closed, the edge 66 is a top edge and the edge 68 is a bottom edge. When the lower section 32 is in the intermediate deployed position, the edge 66 may be referred to as a front edge and the edge 68 may be referred to as a rear edge.

The second panel 53 includes a first surface 70 and a second surface 72 opposite the first surface 70. When the lower section 32 is in the closed position, the first surface 70 generally faces the front trunk 26 and is in direct contact with the second surface 56 of the first panel 51. When the lower section 32 is in the intermediate deployed position, the first surface 70 may be referred to as a top surface of the second panel 53, and the second surface 72 may be referred to as a bottom surface of the second panel 53. The second surface 72 of the second panel 53 also provides an exterior of the lower portion of the grille of the vehicle 10. The first and second surfaces 70, 72 extend laterally between opposed sides 74, 76, which in this example fit between opposed headlamps 62, 64. The first and second surfaces 70, 72 also extend between edges 78, 80. When the lower section 32 is closed, the edge 80 is a top edge and the edge 78 is a bottom edge. When the lower section 32 is in the intermediate deployed position, the edge 80 may be referred to as a front edge and the edge 78 may be referred to as a rear edge.

The first panel 51 and second panel 53 exhibit a height $D_3$, which is substantially equal to the difference between $D_1$ and $D_2$. The first and second panels 51, 53 exhibit substantially the same surface area in this example. The surface area of the first panel 51 is defined by multiplying the length between sides 58, 60 by the height between edges 66, 68. The height between edges 66, 68 is equal to $D_3$. The surface area of the second panel 53 is defined similarly by multiplying the length between the sides 74, 76 by the height between edges 78, 80.

In the intermediate deployed position, the first panel 51 and second panel 53 are vertically stacked such that the first panel 51 is vertically above the second panel 53 and substantially covers the second panel 53 when viewed from a vertically upper perspective. The first and second panels 51, 53 may be selectively attached together in the closed and intermediate deployed positions such that the first and second panels 51, 53 move together with one another. In an example, a releasable latch or magnet, or the like, may selectively hold the first and second panels 51, 53 together.

In this example, the second panel 53 is connected to the hinges 35 adjacent the edge 78. The first panel 51 is not directly connected to the hinges 35. The first panel 51 only indirectly connected to the hinges 35 via the second panel 53.

In the intermediate deployed position, the lower section 32 has rotated substantially 90° about axis $A_2$ relative to the closed position. Specifically, the first and second panels 51, 53 have rotated together substantially 90° about axis $A_2$. Use of the term "substantially" with respect to angles of rotation is a reference to acceptable tolerances, such as ±3°. When in the intermediate deployed position, the surface area of the uppermost surface of the lower section 32 is defined by the surface area of the first panel 51. The first panel 51, and in particular the first surface 56, are substantially parallel to the ground surface G in the intermediate deployed position. The ground surface G is the surface immediately under the wheels 14 of the vehicle 10, and may be concrete, pavement, grass, dirt, etc. In the intermediate deployed position, the first panel 51 is useable as a tabletop surface, albeit one with a relatively small surface area. That said, in the intermediate deployed position, because the lower section 32 only projects outward from the front trunk 26 by a distance substantially equal to $D_3$, the front trunk 26 can be readily loaded and unloaded by a user, because the user can stand relatively close to the front opening 47.

Figure 4:
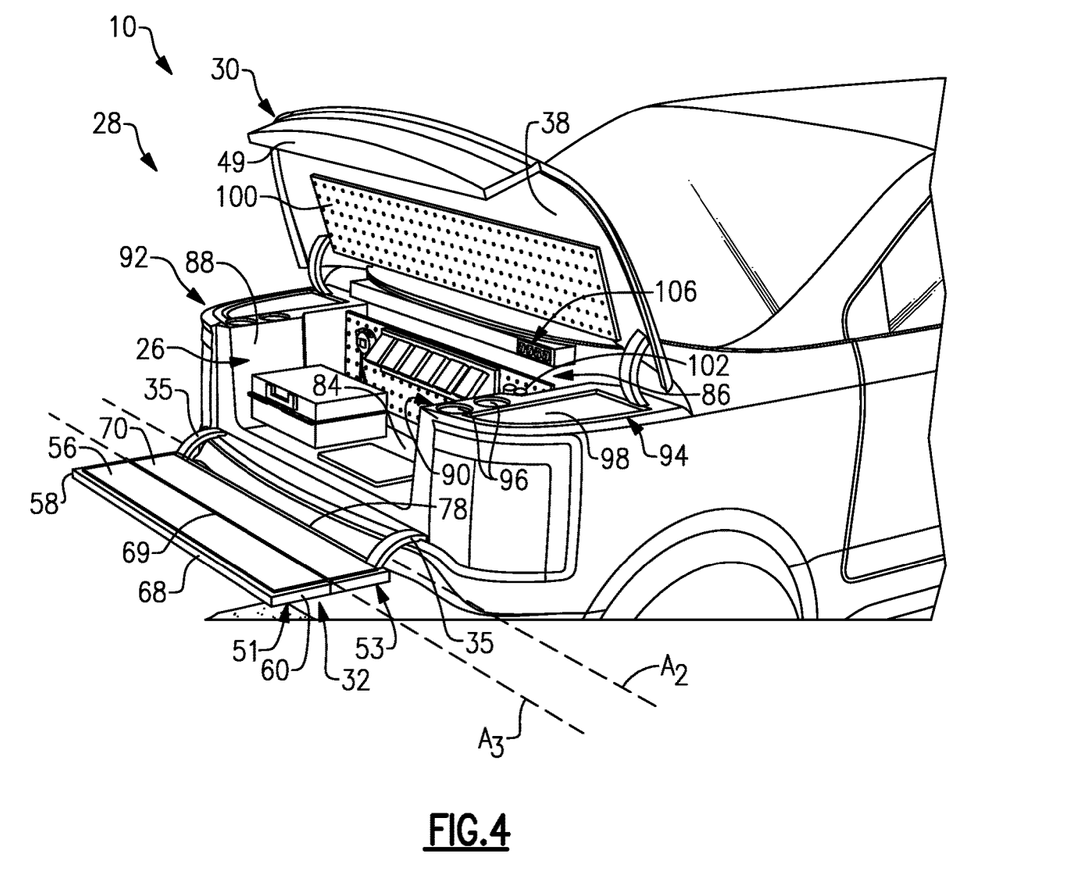
FIG. 4 is a perspective view of the exemplary front trunk from an opposite side as shown in FIGS. 2 and 3, and illustrates the front trunk with the upper section in the open position, and the lower section in a fully deployed position.

The lower section 32 is also configurable in a fully deployed position in which the lower section 32 exhibits a greater upper surface area than in the intermediate deployed position, as shown in FIG. 4. In FIG. 4, the first panel 51 has rotated substantially 180° forward relative to second panel 53 between the intermediate deployed position and fully deployed position. In this way, the first panel 51 is no longer vertically above the second panel 53 and is instead entirely forward of the second panel 53 in this example. The second panel 53 does not move as the lower section 32 moves between the intermediate and fully deployed positions. When moving from the intermediate to the fully deployed position, the first panel 51 rotates about axis $A_3$, which is arranged between the first and second panels 51, 53 adjacent edges 66, 80. The axis $A_3$ may be provided by a hinged connection 69. When a selectively releasable connection is provided between the first and second panels 51, 53, that connection is released before initiating movement of the first panel 51 relative to the second panel 53.

In the fully deployed position, the first and second panels 51, 53 lie in a common plane, which is substantially parallel to the ground surface G. In the fully deployed position, the upper surface area of the lower section 32 is defined by a distance between edge 68 and edge 78, which is substantially equal to twice $D_3$, multiplied by a distance equal to the length of the first and second panels 51, 53 (which here are substantially equal), such as the distance between side 58 and side 60. In the fully deployed position, the upper surface area of the lower section 32 is substantially twice the upper surface area of the lower section 32 when in the intermediate deployed position. In the intermediate deployed position, the upper surface area of the lower section 32 is equal to the surface area of the surface 56. The fully deployed position provides more usable tabletop space, which is beneficial for entertainment or work activities.

To close the lower section 32, the first panel 51 is rotated rearwardly about axis $A_3$ by substantially 180° back to the intermediate deployed position, and the first and second panels 51, 53 are rotated together with one another substantially 90° rearwardly about axis $A_2$ to the closed position.

In this example, in the fully deployed position, the upper surface of the lower section 32 includes one or more features configured to facilitate use of the lower section 32 as a tabletop. For instance, in this example, surfaces 56, 70, which provide the upper surface of the lower section 32 in the fully deployed position, may be formed at least partially of a different texture or finished surface than a remainder of the first and second panels 51, 53. The surfaces 56, 70 may be formed as a textured or finished surfaces configured to resist sliding of items places on the surfaces 56, 70, and could alternatively be configured to receive a rubber mat. The surfaces 56, 70 could alternatively or additionally be configured to include or receive a wireless charging pad configured to charge computing devices or mobile devices.

When the upper and lower sections 30, 32 are closed, the edges 66, 80 fit relative to a bottom edge 49 of the upper grille section 45 to enclose the front trunk 26 and seal the front trunk 26 relative to the outside environment. In particular, the edges 66, 80 abut the bottom edge 49 either directly or indirectly via a seal or gasket, as examples.

The front trunk 26 includes a number of features that, in combination with the closure assembly 28 and in particular the configuration of the lower section 32, increase the usability of the front trunk 26. With reference to FIG. 4, the front trunk includes a floor 84, a rear wall 86, and opposed lateral side walls 88, 90, which provide boundaries of the front cargo space of the vehicle 10. Various items, such as a toolbox and tablet, are resting on the floor 84, and various other items such as tools and chargers are attached to the rear wall 86.

Laterally outward of the side walls 88, 90, side ledges 92, 94 are accessible and usable when the upper section 30 is open. The side ledges 92, 94 extend laterally from an upper portion of a respective one of the side walls 88, 90 to an exterior side of the vehicle 10, and otherwise generally exhibit a similar contour to the upper section 30 such that when the upper section 30 is closed, the upper section 30 overlaps and covers the side ledges 92, 94. In an example, the upper section 30 directly abuts the side ledges 92, 94 when the upper section 30 is closed. The side ledges 92, 94 are configured as useable spaces when the upper section 30 is open. With reference to side ledge 94, the side ledge 94 includes two cup holders 96 and a work surface 98. The side ledge 92 is configured similarly, but reflected about the centerline of the vehicle 10. The work surface 98 is substantially parallel to the floor 84 of the front trunk 26. The work surface 98 may be formed as a textured or finished surface configured to resist sliding of items places on the work surface 98. In this regard, the work surface 98 may be considered a storage tray. The work surface 98 could alternatively be configured to receive a rubber mat. The work surface 98 could alternatively or additionally be configured to include or receive a wireless charging pad configured to charge computing devices or mobile devices.

In this example, the front trunk 26 also includes mounts configured to facilitate mounting of various items such as tools. As shown, the front trunk 26 includes two perforated hardboards 100, 102 mounted or incorporated into the first surface 38 of the upper section 30 and rear wall 86, respectively. The perforated hardboards 100, 102 can be used for the storage of tools and equipment, as examples. The perforated hardboards 100, 102 include equally-spaced apart holes configured to receive standard sized pegs, hooks, or other adapters configured to mount and store various items. In another example, the first surface 38 and/or rear wall 86 are integrally formed with equally-spaced holes corresponding to those of perforated hardboard.

The front trunk 26 may include various power outlets. As one example, the front trunk 26 includes four 120 Volt power outlets 106. The front trunk 26 could include a different number or type of power outlets, including 240 Volt power outlets, USB-C outlets, etc. The power outlets 106 can conveniently charge items such as tools, computing devices, or mobile devices that are being used relative to the front trunk 26. The front trunk 26 could include power outlets in additional locations other than what is shown in the figures.

In an embodiment, the upper and lower sections 30, 32 are manually moveable between the open and closed positions. However, the upper and lower sections 30, 32 could be opened automatically using one or more powered actuators. In this instance, a user could initiate opening and/or closing of the upper and lower sections 30, 32 by initiating an open or close command on a keyfob, on mobile device of the user, by a button on an exterior of the vehicle 10, and/or by a user interface in the passenger cabin 22. For instance, a user could press a button that causes the lower section 32 to move from the closed position to the intermediate deployed position. Alternatively, a user could press another button that causes the lower section 32 to move from the closed position to the fully deployed position without stopping in the intermediate deployed position. When the upper and lower sections 30, 32 are powered, the powered actuators can hold the upper and lower sections 30, 32 in place in the open, closed, intermediate deployed, and fully deployed positions. Alternatively or additionally, the hinges 34, 35, 69 may cooperate with one or more detents and/or releasable latches configured to hold the upper and lower sections 30, 32 in the open and closed positions. For instance, the edge 66 and/or 80 could include a releasable latch configured to engage a projection from the bottom edge 49 to hold the upper and lower sections 30, 32 in the closed position.

In both embodiments, the various surfaces of the front trunk 26 and upper and lower sections 30, 32 may be made of a polymeric material. However, other materials, including metallic materials, are also contemplated within the scope of this disclosure.

The various work surfaces discussed above, including the surfaces 56, 70, 98, etc., could include one or more embossings that establish one or more measurement rulers for measuring items when positioned atop the work surface. Each of the work surfaces may include cup holders, storage trays, power outlets, etc. The front trunk 26 could also be fitted with various storage compartments and other features such as speakers for listening to music or other audio during tailgating, work, or other activities, and an interface for controlling the speakers. Any electronics, including power outlets, can be electrically connected to and powered by the battery pack 18.

Further, the vehicle 10 can a controller C (FIG. 1) that is part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. As examples, the controller C can selectively direct power to the power outlets 106, charge power tools mounted to the perforated hardboard 100, 102, and/or command powered actuators (if present) to open and close the upper and lower sections 30, 32, among other functions.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a front trunk establishing a cargo space; and
   a closure assembly configured to selectively cover and uncover the front trunk, wherein the closure assembly includes an upper section and a lower section moveable independent of the upper section, wherein the lower section is configured to move between a closed position, an intermediate deployed position in which the lower section uncovers a portion of the front trunk, and a fully deployed position in which an upper surface area of the lower section is greater than the upper surface area of the lower section in the intermediate deployed position, wherein the lower section provides at least a portion of a grille of the vehicle, and wherein the upper section provides a hood and a portion of the grille.

2. The motor vehicle as recited in claim 1, wherein the lower section includes first and second panels moveable independent of one another.

3. The motor vehicle as recited in claim 2, wherein, when the lower section is in the fully deployed position, at least a portion of an upper surface of the first panel and at least a portion of an upper surface of the second panel are formed of a different texture or finished surface than a remainder of the first and second panels.

4. The motor vehicle as recited in claim 2, wherein, when the lower section is in the intermediate deployed position, the first panel covers the second panel when the lower section is viewed from a vertically upper perspective.

5. The motor vehicle as recited in claim 2, wherein, when the lower section is in the fully deployed position, the first panel is forward of the second panel.

6. The motor vehicle as recited in claim 2, wherein the lower section is configured such that when moving from the closed position to the intermediate deployed position, the first and second panels rotate substantially 90°.

7. The motor vehicle as recited in claim 6, wherein the first and second panels are rotatable from the closed position to the intermediate deployed position about an axis adjacent a bottom edge of the lower section.

8. The motor vehicle as recited in claim 6, wherein the lower section is configured such that when moving from the intermediate deployed position to the fully deployed position, the first panel rotates substantially 180° relative to the second panel.

9. The motor vehicle as recited in claim 8, wherein the first panel is moveable from the intermediate deployed position to the fully deployed position about an axis adjacent a front edge of the second panel.

10. The motor vehicle as recited in claim 1, wherein, when the lower section is in the fully deployed position, the upper surface area of the lower section is substantially twice the upper surface area of the lower section in the intermediate deployed position.

11. The motor vehicle as recited in claim 10, wherein:
    the lower section includes first and second panels moveable independent of one another,
    when the lower section is in the fully deployed position, surfaces of both the first and second panels define the upper surface area of the lower section, and
    when the lower section is in the intermediate deployed position, the upper surface area of the lower section is only defined by a surface the first panel.

12. The motor vehicle as recited in claim 1, wherein the upper section is moveable in a direction generally opposite the lower section to uncover the front trunk.

13. The motor vehicle as recited in claim 1, wherein the motor vehicle is a battery electric vehicle.

14. A method, comprising:
    moving a lower section of a closure assembly of a front trunk relative to an upper section of the closure assembly, wherein the step of moving the lower section includes moving the lower section from a closed position in which the lower section covers a front portion of the front trunk to an intermediate deployed position in which the lower section uncovers the front trunk, wherein the lower section provides at least a portion of a grille of the vehicle, and wherein the upper section provides a hood and a portion of the grille; and moving the lower section from the intermediate deployed position to a fully deployed position in which an upper surface area of the lower section is increased relative to the upper surface area of the lower section in the intermediate deployed position.

15. The method as recited in claim 14, wherein the lower section includes first and second panels moveable independent of one another, and wherein, when the lower section is in the intermediate deployed position, the first panel covers the second panel when the lower section is viewed from a vertically upper perspective.

16. The method as recited in claim 15, wherein, when the lower section is in the fully deployed position, the first panel is forward of the second panel.

17. The method as recited in claim 16, wherein moving the lower section from the closed position to the intermediate deployed position includes rotating the first and second panels by substantially 90° about an axis adjacent a bottom edge of the lower section.

18. The method as recited in claim 17, wherein moving the lower section from the intermediate deployed position to the fully deployed position includes rotating the first panel by substantially 180° relative to the second panel about an axis adjacent a forward edge of the second panel.

* * * * *